US010116920B2

(12) United States Patent
Vollrath et al.

(10) Patent No.: US 10,116,920 B2
(45) Date of Patent: *Oct. 30, 2018

(54) BALANCING COLORS IN A SCANNED THREE-DIMENSIONAL IMAGE

(71) Applicant: FARO Technologies, Inc., Lake Mary, FL (US)

(72) Inventors: Joachim E. Vollrath, Marbach am Neckar (DE); Martin Ossig, Tamm (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/699,329

(22) Filed: Sep. 8, 2017

(65) Prior Publication Data

US 2018/0014002 A1 Jan. 11, 2018

Related U.S. Application Data

(63) Continuation of application No. 14/516,609, filed on Oct. 17, 2014, now Pat. No. 9,762,883.

(30) Foreign Application Priority Data

Oct. 17, 2013 (DE) .................. 10 2013 017 500

(51) Int. Cl.
*H04N 13/00* (2018.01)
*G01C 3/02* (2006.01)
(Continued)

(52) U.S. Cl.
CPC ........... *H04N 13/15* (2018.05); *G01B 11/002* (2013.01); *G01C 3/02* (2013.01); *G01C 3/08* (2013.01);
(Continued)

(58) Field of Classification Search
CPC ..... G01B 11/002; G01C 11/025; G01C 11/08; G01C 3/02; H04N 13/0037; H04N 13/0051
See application file for complete search history.

(56) References Cited

U.S. PATENT DOCUMENTS 8,705,016 B2 * 4/2014 Schumann ............ G01S 7/4812
356/3.01
2003/0071194 A1 4/2003 Mueller et al.
(Continued)

FOREIGN PATENT DOCUMENTS

WO 9705449 A1 2/1997
WO 2004006181 A2 1/2004

OTHER PUBLICATIONS

PCT International Search Report and Written Opinion of the International Searching Authority for International Application No. PCT/US2014/060992, dated Feb. 3, 2015, 11 pages. PCT1051PCT.

*Primary Examiner* — Md Haque
*Assistant Examiner* — Nazmul Haque
(74) *Attorney, Agent, or Firm* — Cantor Colburn LLP

(57) ABSTRACT

A method of balancing colors of three-dimensional (3D) points measured by a scanner from a first location and a second location. The scanner measures 3D coordinates and colors of first object points from a first location and second object points from a second location. The scene is divided into local neighborhoods, each containing at least a first object point and a second object point. An adapted second color is determined for each second object point based at least in part on the colors of first object points in the local neighborhood.

17 Claims, 10 Drawing Sheets

(51) Int. Cl.
- *H04N 13/15* (2018.01)
- *G01C 3/08* (2006.01)
- *G01C 3/10* (2006.01)
- *G01S 7/48* (2006.01)
- *G01S 17/42* (2006.01)
- *G01B 11/00* (2006.01)
- *G01C 11/08* (2006.01)
- *G01C 11/02* (2006.01)
- *G01S 17/89* (2006.01)
- *H04N 13/167* (2018.01)

(52) U.S. Cl.
CPC .............. *G01C 3/10* (2013.01); *G01C 11/025* (2013.01); *G01C 11/08* (2013.01); *G01S 7/4802* (2013.01); *G01S 17/42* (2013.01); *G01S 17/89* (2013.01); *H04N 13/167* (2018.05)

(56) References Cited

U.S. PATENT DOCUMENTS

| | | |
|---|---|---|
| 2003/0231793 A1 | 12/2003 | Crampton |
| 2006/0132803 A1 | 6/2006 | Clair et al. |
| 2006/0152522 A1 | 7/2006 | Strassenburg et al. |
| 2007/0195333 A1 | 8/2007 | Negishi |
| 2008/0143997 A1 | 6/2008 | Greenberg et al. |
| 2009/0323121 A1* | 12/2009 | Valkenburg .......... G01B 11/002 358/1.18 |
| 2010/0188504 A1 | 7/2010 | Dimsdale et al. |
| 2011/0069322 A1 | 3/2011 | Hoffer |
| 2012/0044476 A1 | 2/2012 | Earhart et al. |
| 2012/0057174 A1 | 3/2012 | Briggs |
| 2012/0069352 A1 | 3/2012 | Ossig et al. |
| 2013/0070250 A1* | 3/2013 | Ditte .................... G01C 15/002 356/445 |
| 2013/0212854 A1 | 8/2013 | Holzapfel et al. |
| 2015/0109419 A1 | 4/2015 | Vollrath et al. |

* cited by examiner

BALANCING COLORS IN A SCANNED THREE-DIMENSIONAL IMAGE

CROSS-REFERENCE TO RELATED APPLICATIONS

The present application is a continuation application of U.S. patent application Ser. No. 14/516,609 filed on Oct. 17, 2014, which claims the benefit of German Patent Application No. DE102013017500.3, filed Oct. 17, 2013, the contents of both of which are incorporated herein by reference.

BACKGROUND

U.S. Pat. No. 8,705,016 ('016) describes a laser scanner by which a rotatable mirror emits a light beam into its environment to generate a three-dimensional (3D) scan. The contents of this patent are hereby incorporated by reference.

The subject matter disclosed herein relates to use of a 3D laser scanner time-of-flight (TOF) coordinate measurement device. A 3D laser scanner of this type steers a beam of light to a non-cooperative target such as a diffusely scattering surface of an object. A distance meter in the device measures a distance to the object, and angular encoders measure the angles of rotation of two axles in the device. The measured distance and two angles enable a processor in the device to determine the 3D coordinates of the target.

A TOF laser scanner is a scanner in which the distance to a target point is determined based on the speed of light in air between the scanner and a target point. Laser scanners are typically used for scanning closed or open spaces such as interior areas of buildings, industrial installations and tunnels. They may be used, for example, in industrial applications and accident reconstruction applications. A laser scanner optically scans and measures objects in a volume around the scanner through the acquisition of data points representing object surfaces within the volume. Such data points are obtained by transmitting a beam of light onto the objects and collecting the reflected or scattered light to determine the distance, two-angles (i.e., an azimuth and a zenith angle), and optionally a gray-scale value. This raw scan data is collected, stored and sent to a processor or processors to generate a 3D image representing the scanned area or object.

Generating an image requires at least three values for each data point. These three values may include the distance and two angles, or may be transformed values, such as the x, y, z coordinates. In an embodiment, an image is also based on a fourth gray-scale value, which is a value related to irradiance of scattered light returning to the scanner.

Most TOF scanners direct the beam of light within the measurement volume by steering the light with a beam steering mechanism. The beam steering mechanism includes a first motor that steers the beam of light about a first axis by a first angle that is measured by a first angular encoder (or other angle transducer). The beam steering mechanism also includes a second motor that steers the beam of light about a second axis by a second angle that is measured by a second angular encoder (or other angle transducer).

Many contemporary laser scanners include a camera mounted on the laser scanner for gathering camera digital images of the environment and for presenting the camera digital images to an operator of the laser scanner. By viewing the camera images, the operator of the scanner can determine the field of view of the measured volume and adjust settings on the laser scanner to measure over a larger or smaller region of space. In addition, the camera digital images may be transmitted to a processor to add color to the scanner image. To generate a color scanner image, at least three positional coordinates (such as x, y, z) and three color values (such as red, green, blue "RGB") are collected for each data point.

The color values obtained with the color camera may be assigned to measured scan points. A 3D image of a scene may require multiple scans from different positions. The overlapping scans are registered in a joint coordinate system as described in U.S. Published Patent Application No. 2012/0069352, the contents of which are incorporated herein by reference. Because of differences in lighting conditions, the colors provided by a scanner color camera for a given object surface will in general differ for the scanner located at each of the multiple scanner positions. This color information provided by the color camera is mapped onto the 3D information provided by the scanner. The differences in the colors provided to the 3D image from the different scanner positions may result in a variety of color problems. For example, in transitions from overlapping regions of 3D data points to regions in which data is captured only from a single scanner position, a discontinuous change of color may be observed.

Accordingly, while existing 3D scanners are suitable for their intended purposes, what is needed is a 3D scanner having certain features of embodiments of the present invention.

BRIEF DESCRIPTION

According to one aspect of the invention, a method is provided for optically scanning and measuring a scene, the method including providing a first scanner, the scanner including a first light emitter for emitting light onto the scene, a first light receiver for receiving light from the scene, and a first processor; providing a second scanner, the second scanner including a second light emitter for emitting light onto the scene, a second light receiver for receiving light from the scene, and a second processor; measuring with the first scanner in a first scanner location three-dimensional (3D) coordinates and a color for each of a plurality of first object points in the scene; measuring with the second scanner in a second scanner location 3D coordinates and a color for each of a plurality of second object points in the scene; selecting a plurality of local neighborhoods within the scene, each local neighborhood including at least one first object point and at least one second object point; determining an adapted second color for each second object point, wherein in each of the local neighborhoods the adapted second color is based at least in part on the colors of the first object points in the local neighborhood; storing the 3D coordinates and the color for each first object point; and storing the 3D coordinates and the adapted second color for each second object point According to another aspect of the invention, a method is provided for optically scanning and measuring a scene, the method including providing a first scanner, the scanner including a first light emitter for emitting light onto the scene, a first light receiver for receiving light from the scene, and a first processor; providing a second scanner, the second scanner including a second light emitter for emitting light onto the scene, a second light receiver for receiving light from the scene, and a second processor; measuring with the first scanner in a first scanner location three-dimensional (3D) coordinates and a color for each of a plurality of first object points in the scene; measuring with the second scanner in a second scanner location 3D coordinates and a color for each of a plurality of second object points in the scene; selecting a plurality of local neighborhoods within the scene, each local neighborhood including at least one first object point and at least one second object point; determining an adapted second color for each second object point, wherein in each of the local neighborhoods the adapted second color is based at least in part on the colors of the first object points in the local neighborhood and on the color of the second object point; storing the 3D coordinates and the color for each first object point; and storing the 3D coordinates and the adapted second color for each second object point.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

The present invention relates to a 3D coordinate measurement device that collects 3D coordinates of a collection of surface points and, in addition, obtains images from a color camera that are used to color the 3D image of the surface points collected by the scanner. Embodiments of the present invention provide a way to balance colors within the 3D image even if the color camera images are obtained over lighting that varies when viewed from different scanner positions.

Figure 1:
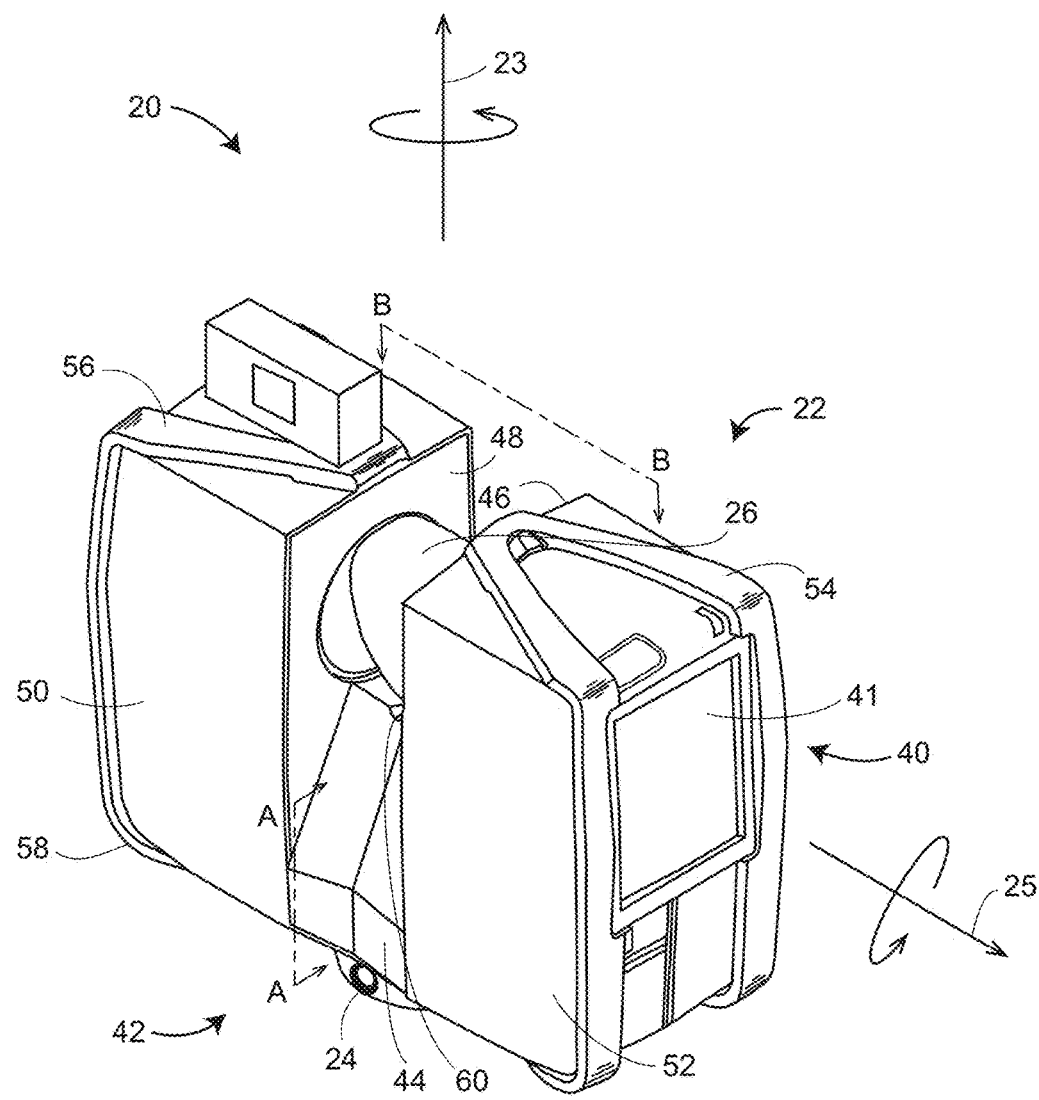
FIG. 1 is a perspective view of a laser scanner in accordance with an embodiment of the invention.
Figure 2:
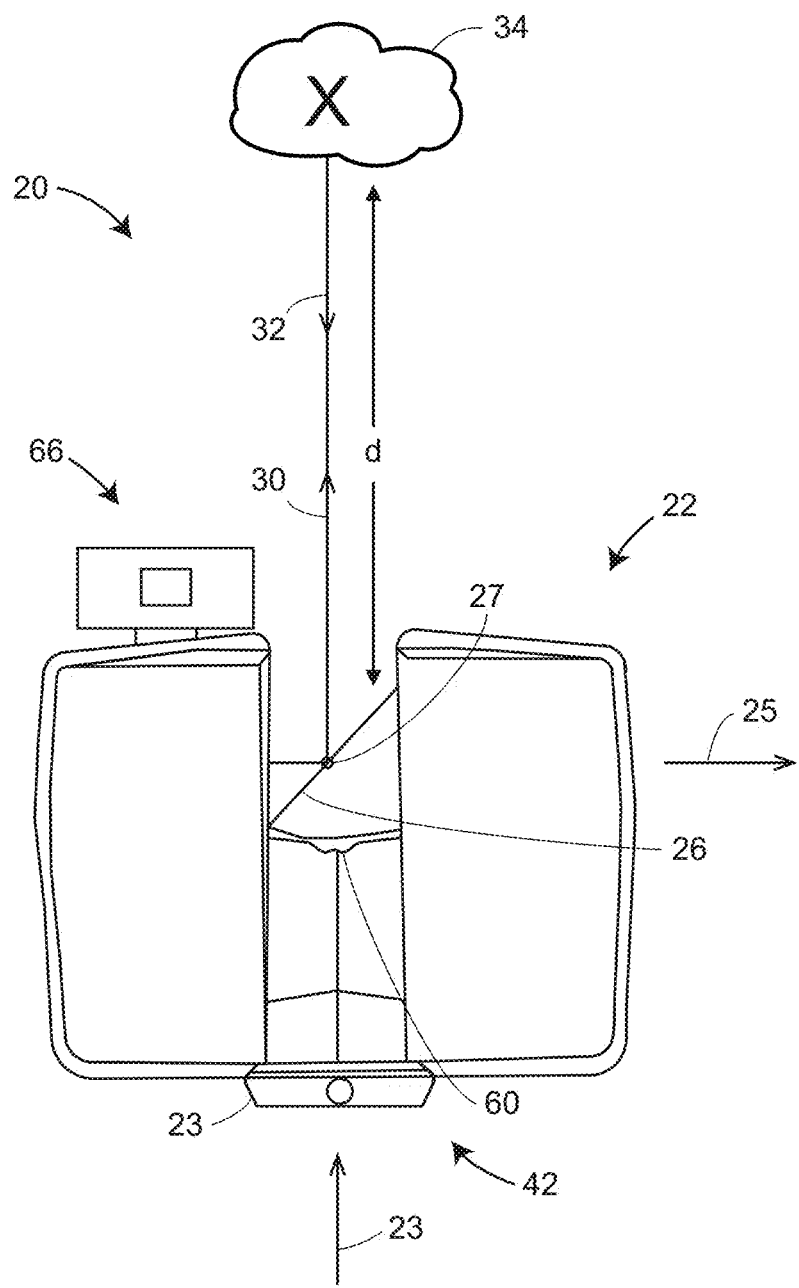
FIG. 2 is a side view of the laser scanner illustrating the method of measurement.
Figure 3:
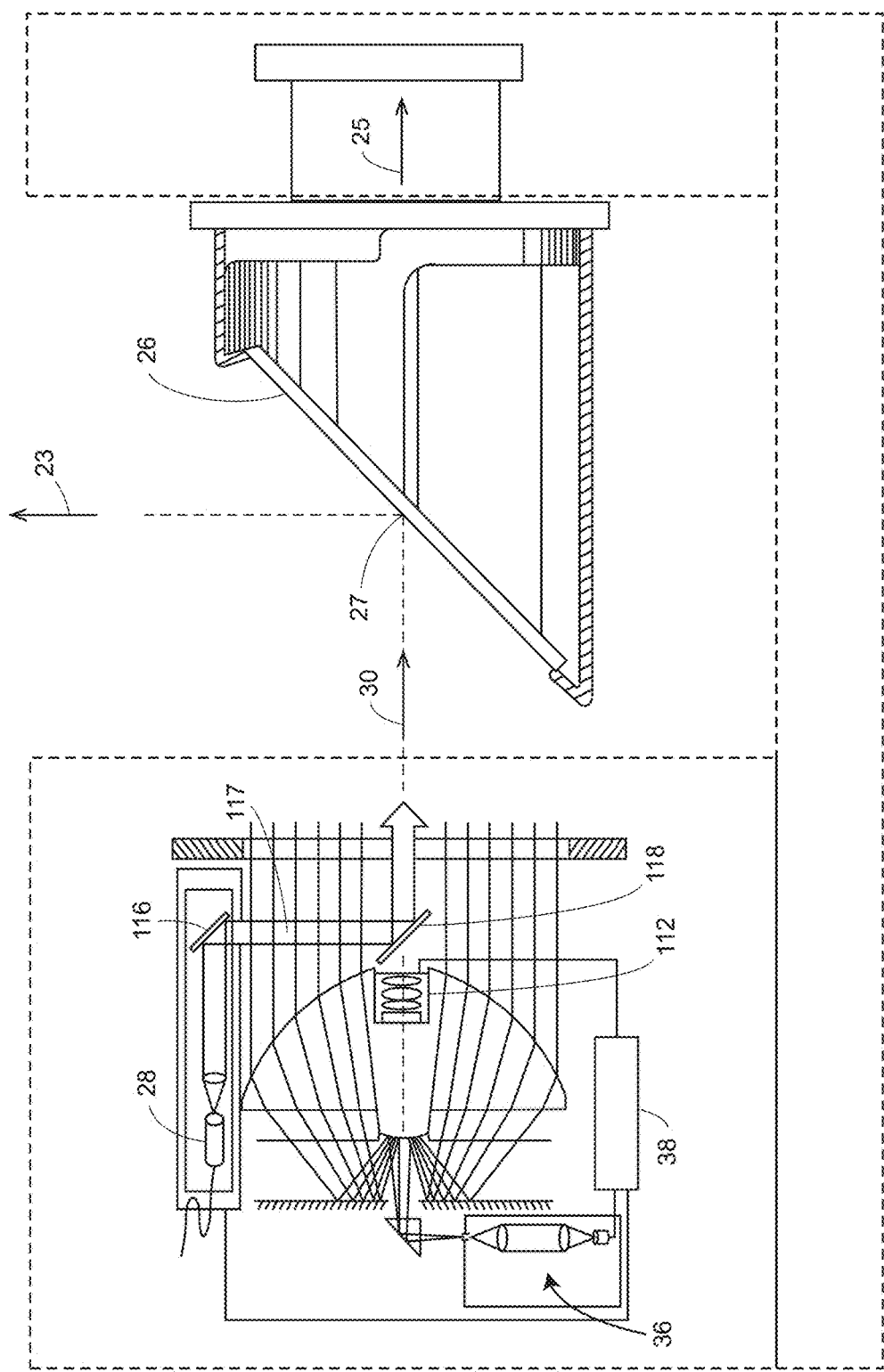
FIG. 3 is a schematic illustration of the optical, mechanical, and electrical components of the laser scanner.

Referring now to FIGS. 1-3, a laser scanner 20 is shown for optically scanning and measuring the environment surrounding the laser scanner 20. The laser scanner 20 has a measuring head 22 and a base 24. The measuring head 22 is mounted on the base 24 such that the laser scanner 20 may be rotated about a vertical axis 23. In one embodiment, the measuring head 22 includes a gimbal point 27 that is a center of rotation about the vertical axis 23 and a horizontal axis 25. The measuring head 22 has a rotary mirror 26, which may be rotated about the horizontal axis 25. The rotation about the vertical axis may be about the center of the base 24. The terms vertical axis and horizontal axis refer to the scanner in its normal upright position. It is possible to operate a 3D coordinate measurement device on its side or upside down, and so to avoid confusion, the terms azimuth axis and zenith axis may be substituted for the terms vertical axis and horizontal axis, respectively. The term pan axis or standing axis may also be used as an alternative to vertical axis.

The measuring head 22 is further provided with an electromagnetic radiation emitter, such as light emitter 28, for example, that emits an emitted light beam 30. In one embodiment, the emitted light beam 30 is a coherent light beam such as a laser beam. The laser beam may have a wavelength range of approximately 300 to 1600 nanometers, for example 790 nanometers, 905 nanometers, 1550 nm, or less than 400 nanometers. It should be appreciated that other electromagnetic radiation beams having greater or smaller wavelengths may also be used. The emitted light beam 30 is amplitude or intensity modulated, for example, with a sinusoidal waveform or with a rectangular waveform. The emitted light beam 30 is emitted by the light emitter 28 onto the rotary mirror 26, where it is deflected to the environment. A reflected light beam 32 is reflected from the environment by an object 34. The reflected or scattered light is intercepted by the rotary mirror 26 and directed into a light receiver 36. The directions of the emitted light beam 30 and the reflected light beam 32 result from the angular positions of the rotary mirror 26 and the measuring head 22 about the axes 25 and 23, respectively. These angular positions in turn depend on the corresponding rotary drives or motors.

Coupled to the light emitter 28 and the light receiver 36 is a controller 38. The controller 38 determines, for a multitude of measuring points X, a corresponding number of distances d between the laser scanner 20 and the points X on object 34. The distance to a particular point X is determined based at least in part on the speed of light in air through which electromagnetic radiation propagates from the device to the object point X. In one embodiment the phase shift of modulation in light emitted by the laser scanner 20 and the point X is determined and evaluated to obtain a measured distance d.

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$. A laser scanner of the type discussed herein is based on the time-of-flight (TOF) of the light in the air (the round-trip time for the light to travel from the device to the object and back to the device). Examples of TOF scanners include scanners that measure round trip time using the time interval between emitted and returning pulses (pulsed TOF scanners), scanners that modulate light sinusoidal and measure phase shift of the returning light (phase-based scanners), as well as many other types. A method of measuring distance based on the time-of-flight of light depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based one known length and two known angles of a triangle. The method of triangulation, therefore, does not directly depend on the speed of light in air.

The scanning of the volume around the laser scanner 20 takes place by relatively quickly rotating the rotary mirror 26 about axis 25 while relatively slowly rotating the measuring head 22 about axis 23, thereby moving the assembly in a spiral pattern. In an exemplary embodiment, the rotary mirror rotates at a maximum speed of 5820 revolutions per minute. For such a scan, the gimbal point 27 defines the origin of the local stationary reference system. The base 24 rests in this local stationary reference system.

In addition to measuring a distance d from the gimbal point 27 to an object point X, the scanner 20 may also collect gray-scale information related to the received optical power (equivalent to term "brightness.") The gray-scale value may be determined at least in part, for example, by integration of the bandpass-filtered and amplified signal in the light receiver 36 over a measuring period attributed to the object point X.

The measuring head 22 may include a display device 40 integrated into the laser scanner 20. The display device 40 may include a graphical touch screen 41, as shown in FIG. 1, which allows the operator to set the parameters or initiate the operation of the laser scanner 20. For example, the screen 41 may have a user interface that allows the operator to provide measurement instructions to the device, and the screen may also display measurement results.

The laser scanner 20 includes a carrying structure 42 that provides a frame for the measuring head 22 and a platform for attaching the components of the laser scanner 20. In one embodiment, the carrying structure 42 is made from a metal such as aluminum. The carrying structure 42 includes a traverse member 44 having a pair of walls 46, 48 on opposing ends. The walls 46, 48 are parallel to each other and extend in a direction opposite the base 24. Shells 50, 52 are coupled to the walls 46, 48 and cover the components of the laser scanner 20. In the exemplary embodiment, the shells 50, 52 are made from a plastic material, such as polycarbonate or polyethylene for example. The shells 50, 52 cooperate with the walls 46, 48 to form a housing for the laser scanner 20.

On an end of the shells 50, 52 opposite the walls 46, 48 a pair of yokes 54, 56 are arranged to partially cover the respective shells 50, 52. In the exemplary embodiment, the yokes 54, 56 are made from a suitably durable material, such as aluminum for example, that assists in protecting the shells 50, 52 during transport and operation. Each yoke 54, 56 includes a first arm portion 58 that is coupled, such as with a fastener for example, to the traverse 44 adjacent the base 24. The arm portion 58 for each yoke 54, 56 extends from the traverse 44 obliquely to an outer corner of the respective shell 50, 54. From the outer corner of the shell, the yokes 54, 56 extend along the side edge of the shell to an opposite outer corner of the shell. Each yoke 54, 56 further includes a second arm portion that extends obliquely to the walls 46, 48. It should be appreciated that the yokes 54, 56 may be coupled to the traverse 42, the walls 46, 48 and the shells 50, 54 at multiple locations.

The pair of yokes 54, 56 cooperate to circumscribe a convex space within which the two shells 50, 52 are arranged. In the exemplary embodiment, the yokes 54, 56 cooperate to cover all of the outer edges of the shells 50, 54, while the top and bottom arm portions project over at least a portion of the top and bottom edges of the shells 50, 52. This provides advantages in protecting the shells 50, 52 and the measuring head 22 from damage during transportation and operation. In other embodiments, the yokes 54, 56 may include additional features, such as handles to facilitate the carrying of the laser scanner 20 or attachment points for accessories for example.

On top of the traverse 44, a prism 60 is provided. The prism extends parallel to the walls 46, 48. In the exemplary embodiment, the prism 60 is integrally formed as part of the carrying structure 42. In other embodiments, the prism 60 is a separate component that is coupled to the traverse 44. When the mirror 26 rotates, during each rotation the mirror 26 directs the emitted light beam 30 onto the traverse 44 and the prism 60. Due to non-linearities in the electronic components, for example in the light receiver 36, the measured distances d may depend on signal strength, which may be measured in optical power entering the scanner or optical power entering optical detectors within the light receiver 36, for example. In an embodiment, a distance correction is stored in the scanner as a function (possibly a nonlinear function) of distance to a measured point and optical power (generally unscaled quantity of light power sometimes referred to as "brightness") returned from the measured point and sent to an optical detector in the light receiver 36. Since the prism 60 is at a known distance from the gimbal point 27, the measured optical power level of light reflected by the prism 60 may be used to correct distance measurements for other measured points, thereby allowing for compensation to correct for the effects of environmental variables such as temperature. In the exemplary embodiment, the resulting correction of distance is performed by the controller 38.

In an embodiment, the base 24 is coupled to a swivel assembly (not shown) such as that described in commonly owned U.S. Pat. No. 8,705,012 ('012), which is incorporated by reference herein. The swivel assembly is housed within the carrying structure 42 and includes a motor that is configured to rotate the measuring head 22 about the axis 23.

An auxiliary image acquisition device 66 may be a device that captures and measures a parameter associated with the scanned volume or the scanned object and provides a signal representing the measured quantities over an image acquisition area. The auxiliary image acquisition device 66 may be, but is not limited to, a pyrometer, a thermal imager, an ionizing radiation detector, or a millimeter-wave detector.

In an embodiment, a camera (first image acquisition device) 112 is located internally to the scanner and may have the same optical axis as the 3D scanner device. In this embodiment, the first image acquisition device 112 is integrated into the measuring head 22 and arranged to acquire images along the same optical pathway as emitted light beam 30 and reflected light beam 32. In this embodiment, the light emitter 28 is reflected off a fixed mirror 116, and travels to dichroic beam-splitter 118 that reflects the light 117 from the light emitter 28 onto the rotary mirror 26. The dichroic beam-splitter 118 allows light to pass through at wavelengths different than the wavelength of light 117. For example, the light emitter 28 may be a near infrared laser light (for example, light at wavelengths of 780 nm or 1150 nm), with the dichroic beam-splitter 118 configured to reflect the infrared laser light while allowing visible light (e.g., wavelengths of 400 to 700 nm) to transmit through. In other embodiments, the determination of whether the light passes through the beam-splitter 118 or is reflected depends on the polarization of the light. The digital camera 112 takes 2D photographic images of the scanned area to capture color data to add to the scanned image. In the case of a built-in color camera having an optical axis coincident with that of the 3D scanning device, the direction of the camera view may be easily obtained by simply adjusting the steering mechanisms of the scanner—for example, by adjusting the azimuth angle about the axis 23 and by steering the mirror 26 about the axis 25.

Figure 4:
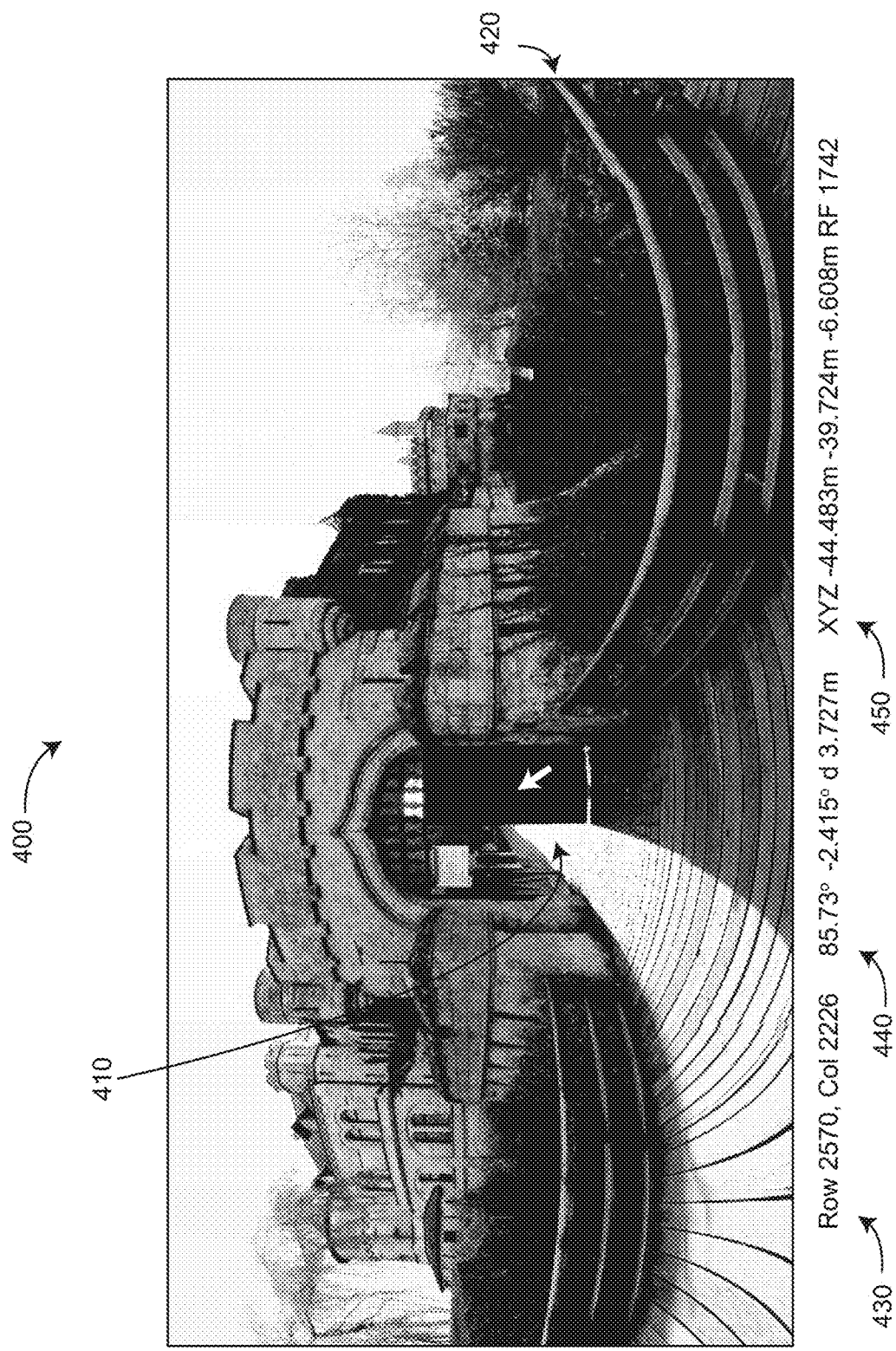
FIG. 4 depicts a planar view of a 3D scanned image.

FIG. 4 depicts an example of a planar view of a 3D scanned image 400. The planar view depicted in FIG. 4 maps an image based on direct mapping of data collected by the scanner. The scanner collects data in a spherical pattern but with data points collected near the poles more tightly compressed than those collected nearer the horizon. In other words, each point collected near a pole represents a smaller solid angle than does each point collected nearer the horizon. Since data from the scanner may be directly represented in rows and columns, data in a planar image is conveniently presented in a rectilinear format, as shown in FIG. 4. With planar mapping described above, straight lines appear to be curved, as for example the straight fence railings 420 that appear curved in the planar view of the 3D image. The planar view may be a 3D unprocessed scanned image displaying just the gray-scale values received from the distance sensor arranged in columns and rows as they were recorded. In addition, the 3D unprocessed scanned image of the planar view may be in full resolution or reduced resolution depending on system characteristics (e.g., display device, storage, processor). The planar view may be a 3D processed scanned image that depicts either gray-scale values (resulting from the light irradiance measured by the distance sensor for each pixel) or color values (resulting from camera images which have been mapped onto the scan). The user interface associated with the display unit, which may be integral to the laser scanner, may provide a point selection mechanism, which in FIG. 4 is the cursor 410. The point selection mechanism may be used to reveal dimensional information about the volume of space being measured by the laser scanner. In FIG. 4, the row and column at the location of the cursor are indicated on the display at 430. The two measured angles and one measured distance (the 3D coordinates in a spherical coordinate system) at the cursor location are indicated on the display at 440. Cartesian XYZ coordinate representations of the cursor location are indicated on the display at 450.

Figure 5:
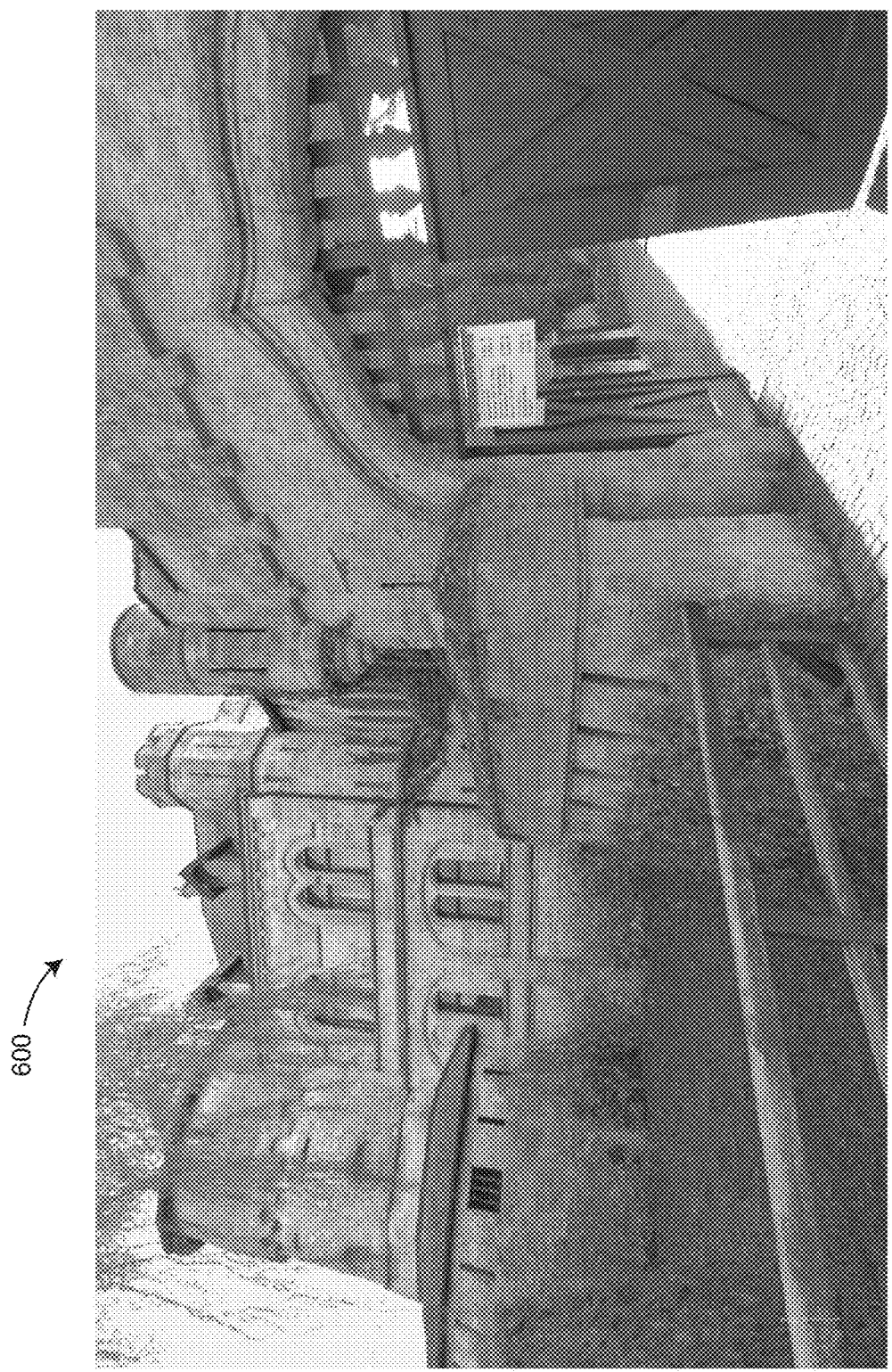
FIG. 5 depicts an embodiment of a panoramic view of a 3D scanned image generated by mapping a planar view onto a sphere.

FIG. 5 depicts an example of a panoramic view of a 3D scanned image 600 generated by mapping a planar view onto a sphere, or in some cases a cylinder. A panoramic view can be a 3D processed scanned image (such as that shown in FIG. 5) in which 3D information (e.g., 3D coordinates) is available. The panoramic view may be in full resolution or reduced resolution depending on system characteristics. It should be pointed out that an image such as FIG. 5 is a 2D image that represents a 3D scene when viewed from a particular perspective. In this sense, the image of FIG. 5 is much like an image that might be captured by a 2D camera or a human eye.

The term panoramic view refers to a display in which angular movement is generally possible about a point in space, but translational movement is not possible (for a single panoramic image). In contrast, the term 3D view as used herein refers to generally refers to a display in which provision is made (through user controls) to enable not only rotation about a fixed point but also translational movement from point to point in space.

Figure 6C:
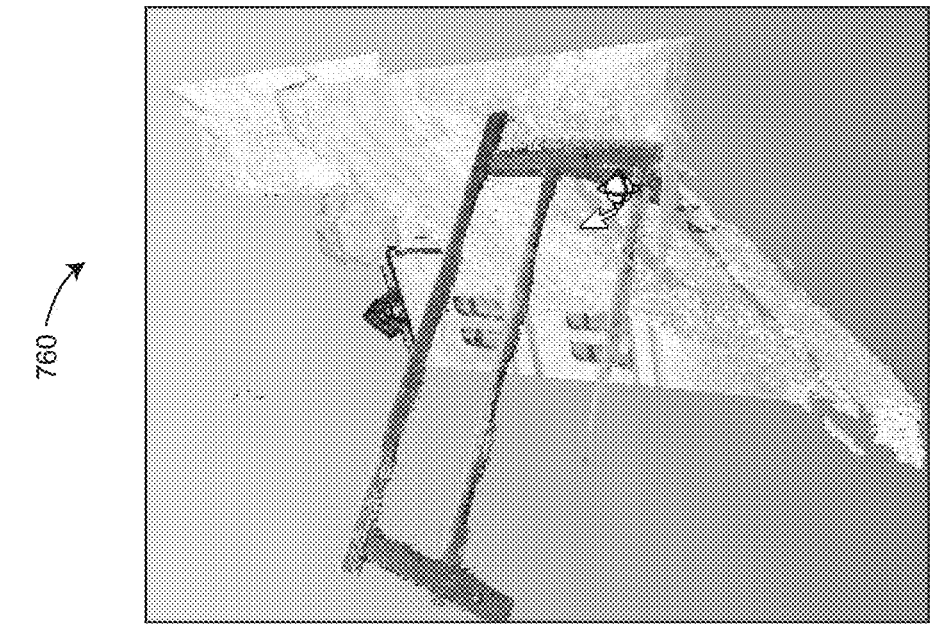
FIGS. 6A, 6B, 6C depict embodiments of a 3D view of a 3D scanned image.
Figure 6B:
Figure 6A:
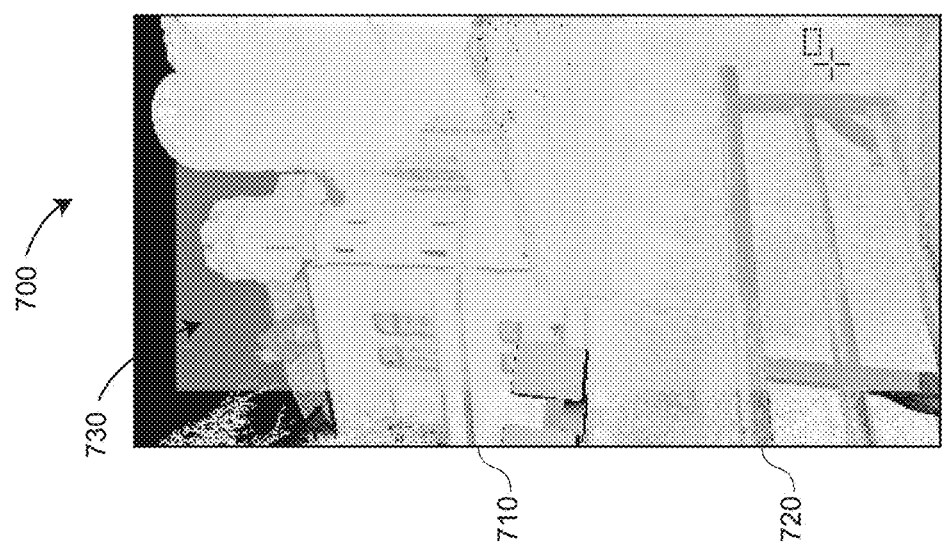
Figure 7:
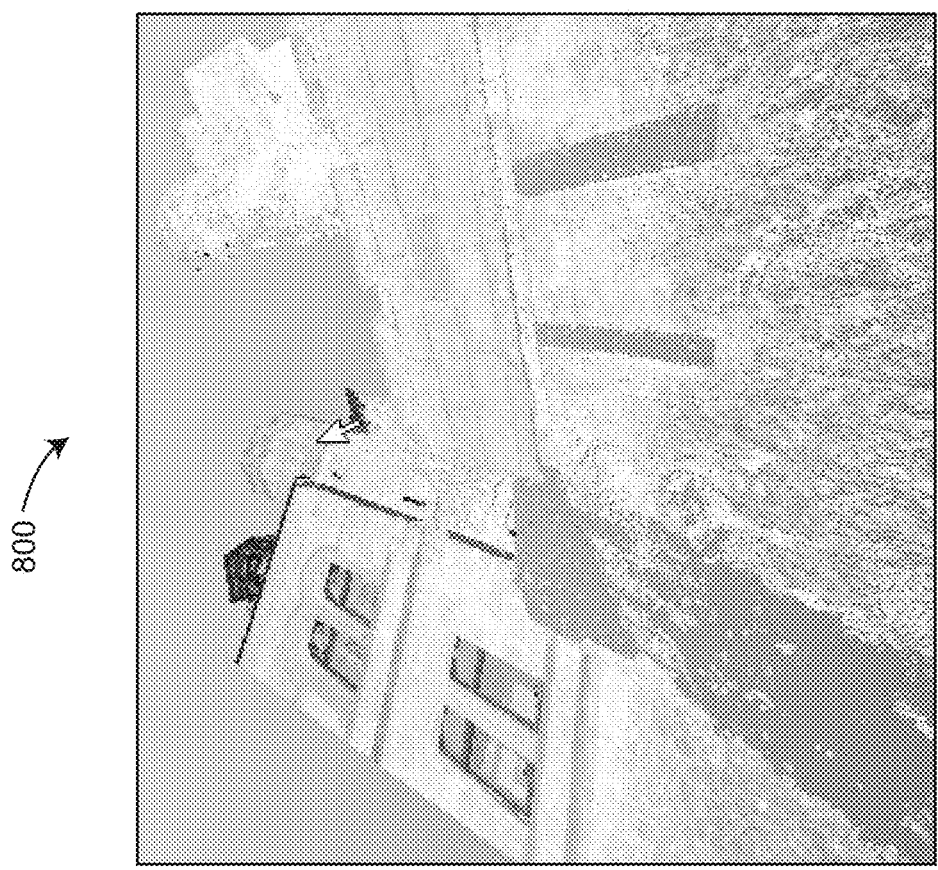
FIG. 7 depicts an embodiment of a 3D view made up of an image of the object of FIG. 6B but viewed from a different perspective and shown only partially.

FIGS. 6A, 6B and 6C depict an example of a 3D view of a 3D scanned image. In the 3D view a user can leave the origin of the scan and see the scan points from different viewpoints and angles. The 3D view is an example of a 3D processed scanned image. The 3D view may be in full resolution or reduced resolution depending on system characteristics. In addition, the 3D view allows multiple registered scans to be displayed in one view. FIG. 6A is a 3D view 710 over which a selection mask 730 has been placed by a user. FIG. 6B is a 3D view 740 in which only that part of the 3D view 710 covered by the selection mask 730 has been retained. FIG. 6C shows the same 3D measurement data as in FIG. 6B except as rotated to obtain a different view. FIG. 7 shows a different view of FIG. 6B, the view in this instance being obtained from a translation and rotation of the observer viewpoint, as well as a reduction in observed area.

To scan a scene from different directions or to scan a large space, multiple scans are captured from different locations (corresponding to a number of different centers $C_m$) and then registered in a joint coordinate system xyz of the scene. The laser scanner 20 must change its location for this purpose, thus moving each time the center $C_m$ of the laser scanner 20 within the joint coordinate system xyz to a new center $C_m$. To easily change the location, the laser scanner 20 may be mounted on a trolley, as described in U.S. Pat. No. 8,699,036 ('036), the contents of which are incorporated by reference. Alternatively, the laser scanner 20 may be mounted on a tripod. When all scans are registered in the joint coordinate system xyz of the scene, the entity of all measuring points X of all scans forms a three-dimensional point cloud.

Registration is performed by matching artificial or natural targets in the environment as viewed in overlapping regions of the different scans. In an embodiment, artificial targets include spheres or checkerboards. In some cases, registration (also referred to as "image registration") is required because the volume being scanned is large. In other cases, it may be necessary to view objects from several directions to fully capture the 3D shapes and features of objects. It may be necessary for example to measure several rooms of a house, including the transitions through doors or other openings.

A scanner with a color camera may, when placed in a plurality of positions, provide 3D and color scan data at each of the scanner positions, which are then registered to obtain a registered 3D scan image. An objective of the current disclosure is to provide a way of providing smooth color transitions in the registered 3D scan image.

In an embodiment, the beam of light 30 may include multiple colors, possibly obtained from three laser diodes within the scanner 20, each of the laser diodes producing light having a different wavelength. The multiple colors of light may include red, green, and blue. The colors of light contained in the reflected light beam 32 indicate the colors of light in the surfaces off which the light is reflected. The colors of the reflected light may be detected by optical detectors within the scanner and the detected colors superimposed on 3D coordinates measured by the scanner to obtain a color 3D scan image.

In another embodiment, the scanner is provided with a color camera such as the color camera 112, which obtains color images of the environment surrounding the scanner. The color images are obtained by steering the color camera 112 to obtain a plurality of color images with the camera pointed in different directions. The colors obtained from the color camera may be processed to provide smooth color transitions even for points collected from different scan positions.

A color of a point in a color image may be described by a quantity in each of a plurality of color channels. For a camera that provides red, green, and blue colors from a color display, the color channels are red, green, and blue (RGB). With a printing process that creates images by overlaying pigments of cyan, magenta, yellow, and black, the color channels are cyan, magenta, yellow, and black (CMYK). For a user independent representation of color that attempts to use colors to match objective color change in proportion to color changes as perceived by humans, the colors might be represented using an L* channel, an a* channel, and a b* channel, where the L* channel is related to the lightness of the color (L*=0 indicates black and L*=100 indicates diffuse white), the a* value indicates a position between red/magenta and green, and the b* value indicates a position between yellow and blue. Notice that L*a*b* is a derived quantity, not a quantity obtained directly from a device such as a camera or projector.

Each type of color channel representation belongs to a corresponding color space. There are many types of color spaces that include the color channels RBG, which may vary somewhat from device to device. A common color channel representation is sRGB, a color space created cooperatively by Hewlett-Packard and Microsoft Corporation for use on the Internet. The Adobe RGB color space is another popular color space, which includes colors available on CMYK color printers.

The color channels L*, a*, and b* belong to a color space called CIELAB or L*a*b*, which as mentioned hereinabove is intended to be more perceptually linear that other color spaces. This type of color space is referred to as a de-correlated color space because the correlations among the different channels are minimized.

For the case in which the scanner includes an internal color camera 112, the points obtained by the 2D camera images in each of the scanner positions will in general not project precisely onto 3D coordinates of points collected by the laser scanner. The scanner will use the controller 38 or an external processor to establish a color for each of the measured 3D points by means of mathematical methods such as interpolation. The 2D color image obtained from a color camera is said to be "mapped onto" the 3D coordinates collected by the scanner. In this instance, the color image is obtained with the color camera at the same or nearly the same location as the scanner. The term mapping as used in this context should not be confused with the term mapping as used in later sections. The meaning of the term mapping for these two cases will be clear from context.

Furthermore, suppose that a scanner is placed in a first location from which it collects 3D coordinates and later collects color images. The colors from these color images are those mapped onto these 3D coordinates. In other words, color images collected from a second scanner location are not mapped onto 3D coordinates obtained from a first scanner location. Also note that 3D coordinates obtained from one different scanner location will not correspond to the 3D coordinates obtained from the other scanner location, even after registration of the scan points into a common frame of reference.

As discussed above, lighting conditions as seen from different tracker positions may cause the colors provided by the color camera 112 to differ for each of the 3D images obtained from the different tracker positions. A way is needed to avoid problems with mis-matched or discontinuous colors.

Figure 11:
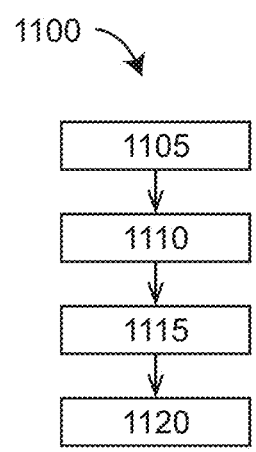
FIG. 11 shows steps in a method according to an embodiment.

In the method 1100 of FIG. 11, it is understood that the order of steps described below is not required but may be changed as desired.

In an embodiment, in a step 1105, the scanner obtains 3D coordinates and colors of object points in a scene. The measurements are obtained from each of a plurality of scanner locations m, which includes at least a first scanner location and a second scanner location. 3D coordinates and colors are collected for first object points from the first scanner location. 3D coordinates and colors are also collected for second object points from the second scanner location. In another embodiment, a first scanner is used to measure first object points from a first scanner location. A different, second scanner is used to measure object points from a second scanner location.

The colors measured by the scanner may be provided by a color camera or by a three-color projection and detection hardware. For the case in which a color camera provides 2D color images, the color camera may be integrated into the scanner, for example, as the color camera 112, or it may be affixed near the scanner. As explained above, the colors provided by the color camera are mapped onto the 3D coordinates measured by the scanner.

Alternatively, the colors measured by the scanner may be included in the beam of light launched from the scanner, and the reflected light sent to optical detectors to measure the different wavelengths, for example, red, green, and blue. In this case, the mapping step described above is not needed.

In a step 1110, the scan data collected from the scanner in the scanner locations m are registered together in a common frame of reference (a joint coordinate system). This means that at least the first object points and the second object points are registered together.

In a step 1115, the scene is subdivided into local neighborhoods. In an embodiment, the local neighborhoods are cells obtained by subdividing the measured space with a three-dimensional grid, as suggested in FIG. 8. In an embodiment, the cells are cubes with an edge length of several centimeters up to some decimeters. Other forms of cells, for example tetrahedrons, are possible.

Figure 8:
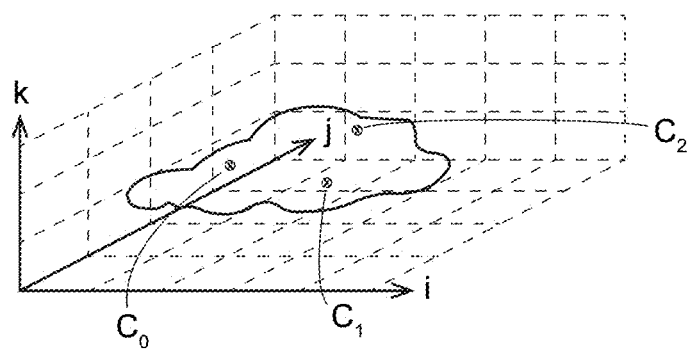
FIG. 8 shows a subdivision of a scene into cells based on a grid.

The index m is assigned to scans having centers $C_m$, and the index i,j,k is applied to cells. In the example of FIG. 8, axes i, j, and k are divided into a grid to provide rectilinear cells. A laser scanner is located in each of three positions designated by the scanner center positions (e.g., gimbal positions) $C_0$, $C_1$, and $C_2$. From these positions, the scanner collects a multitude of points existing within a point cloud, represented by the cloud shape in the figure. □ijk(m), where the vertical lines indicate the number of elements. Hence □ijk(m) is the number of measured points in the cell i,j,k for the scanner at the position m. The distribution of points over all the cells i,j,k from all the positions m is referred to as the point distribution.

In an embodiment, a local neighborhood may be more defined without the use of grids or cells. In this case, adjustments to colors of measured points are based at least in part on a distance between a point for which the color is to be changed (a "reference" point) and points surrounding the reference point. For example, a reference point may be one of the second object points. The color of the reference point would depend at least in part on the colors of some of the surrounding first object points. A roll off function (for example, a Gaussian roll-off function) might be devised so that colors of first object points farther from the reference point would be weighted relatively less than colors of object points nearer the reference point. By sequentially selecting each second object point, the colors of the second object points can be adjusted to match the color statistics of the nearby object points. The color of each reference point may also depend on the color of second object points and the distances between the reference point and nearby second object points. The method described hereinabove for adjusting colors without the use of cells or grids is a general and powerful method, but it requires more computer processing time than the method in which regular grids are used.

In a step 1120, an adapted color is determined for each second object point. The adapted color is a color of an object point that has been adjusted to account for color statistics of surrounding object points. In a simple case, the adapted colors of second object points in a local neighborhood are based on the colors of first object points in that local neighborhood. An alternative case is one in which the adapted colors of first object points and second object points in a local neighborhood are based at least in part on the colors of the first object points and the second object points in the local neighborhood.

In an embodiment, the controller 38 or an external processor converts the native color channel values into source color channel values within a source color space. In an embodiment, the source color space is L*a*b*, but any color space may be used. As is known in the art, transformation from a given color (for example, represented by a three values in three color channels such as RGB) may be transformed into another color (for example, represented by a three values in three alternative color channels such as L*a*b*) by a series of mathematical steps. Mathematical steps may include multiplication of color values by a 3×3 matrix and taking a logarithm of the resulting values.

In an embodiment, color distributions (color statistics) are determined for each of the cells. The color distributions in the source color space for the cell i,j,k □ijkm, where the source distribution S is a vector distribution of color values. In an embodiment, a source vector distribution is obtained through a series of steps. In a first step, the native colors such as RGB are converted into an alternative color space such as L*a*b*. In a second step, the mean and standard deviation of each distribution □ijk, further subject to the constrain that the target distribution is selected to be a □ijk×m□ijk(m) □ijk(m)/m□ijk(m).

Figure 9:
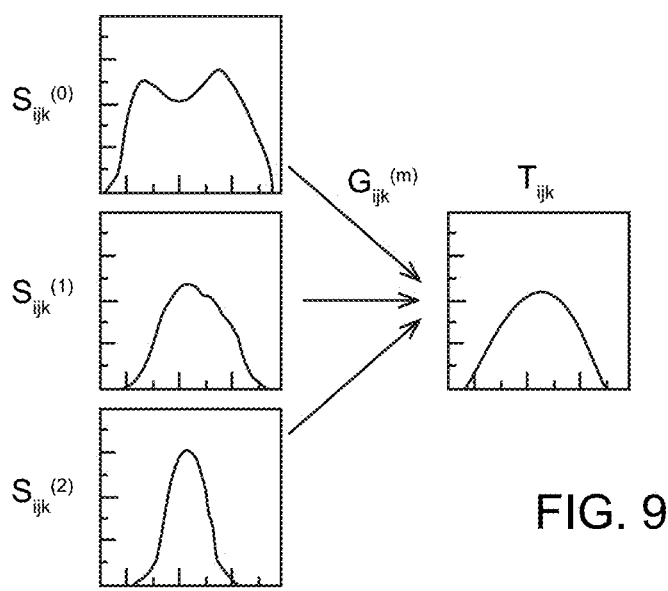
FIG. 9 shows schematic diagrams of the initial color distributions used to obtain a target distribution.

The term "distribution" in the present context may be understood in reference to FIG. 9, which shows an example in which the scanner has measured data points for a cell i,j,k from each of three scanner locations 0, 1, and 2. The three source □ijk0, □ijk1, and □ijk2 are for one of the color channels. The horizontal axis represents the possible values for each of the three color channels, the color channels of which may be derived quantities using the method described above or using any other method. The color values for each color channel may run for example from 0 to □ijk0, □ijk1, and □ijk2 indicates the relative number of measured points having a given value of a*. Each distribution may be represented by a histogram, for example, with the vertical axis being the fraction of points in each of a range of color value "buckets."

A color mapping method that shares some characteristics of the above embodiment is described in Erik Reinhard et al., "Color Transfer between Images," IEEE Computer Graphics and Applications, Vol. 21, No. 5 (September/October 2001), Pages 4-41. The color mapping method applies colors to a 2D target image based on color statistics obtained from a 2D source image.

The step 1120 is completed by determining an adapted color for each of the second object points (or for first and second object points). In the embodiment described in this paragraph, each measured point in a cell i,j,k is assigned a color □ijk. Stating this another way, a mapping function □ijk(m) is created to map the vector source distribution to the target vector distribution for a cell i,j,k and scanner □ijkm:□ijkm→□ijk.

Figure 10:
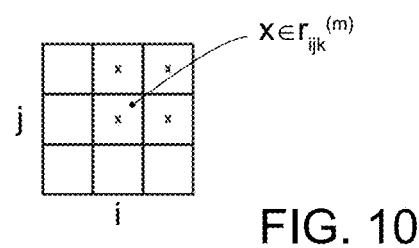
FIG. 10 shows an adjustment of a mapping function to obtain a color of a point based on the distance to nearest neighbor cells and the color distribution of nearest neighbor cells.

The method 1100 described hereinabove establishes, for each cell i,j,k, a consistent set of colors for points measured within each cell. The method reduces discontinuities and inconsistencies caused by lighting or other effects. To avoid discontinuities from cell to cell (on the edges of cells), mapping functions may be mathematically combined to obtain a mapping function for each particular point that accounts for the position of the particular point in relation to adjacent cells. FIG. 10 shows a top view (i, j view) of a measurement point X which is one of the collection of measurement points located in the cell i,j,k and measured from the scanner position m. In an embodiment, weightings for each measured point X in a cell are scaled by the reciprocal of the distance between the measured point and the centers of gravity of the cell and its neighbors. In another embodiment, weightings are based on linear, cubic, or spline interpolations. In another embodiment, weighting are based on a Gaussian distribution.

It should be noted that the measured 3D coordinates, onto each of which is now superimposed a collection of color channel values, may be represented in any of the formats discussed hereinabove with respect to FIGS. 4-7, namely planar format, panoramic format, or full 3D format.

Figure 12:
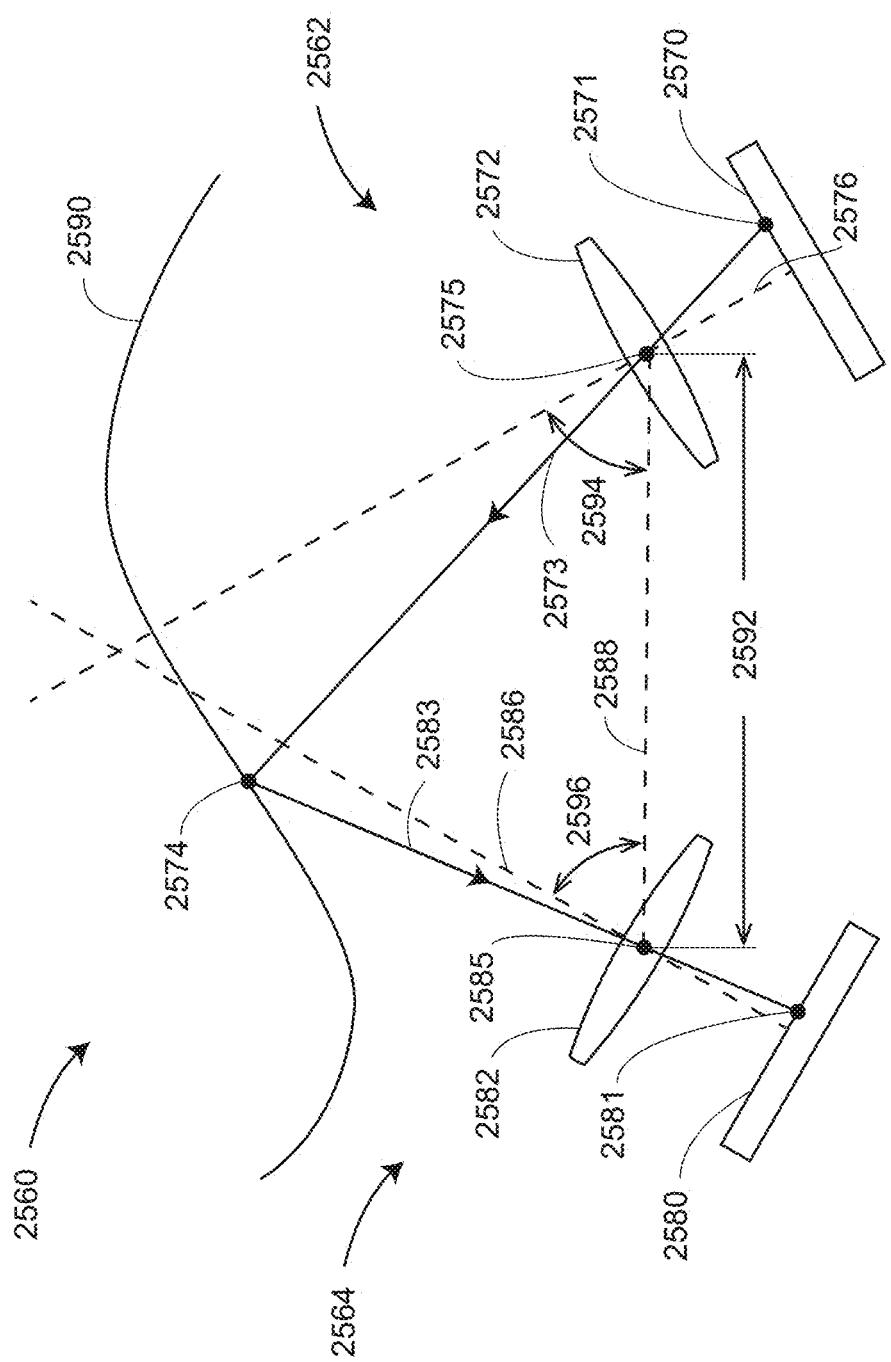
FIG. 12 is illustrates the principle of the operation of a triangulation scanner.

The method described above is applicable to a triangulation scanner as well as a TOF scanner. An explanation of the principles of triangulation is given with reference to the system 2560 of FIG. 12. Referring first to FIG. 12, the system 2560 includes a projector 2562 and a camera 2564. The projector 2562 includes a source pattern of light 2570 lying on a source plane and a projector lens 2572. The projector lens may include several lens elements. The projector lens has a lens perspective center 2575 and a projector optical axis 2576. The ray of light 2573 travels from a point 2571 on the source pattern of light through the lens perspective center onto the object 2590, which it intercepts at a point 2574.

The camera 2564 includes a camera lens 2582 and a photosensitive array 2580. The camera lens 2582 has a lens perspective center 2585 and an optical axis 2586. A ray of light 2583 travels from the object point 2574 through the camera perspective center 2585 and intercepts the photosensitive array 2580 at point 2581.

The line segment that connects the perspective centers is the baseline 2588 in FIG. 12. The length of the baseline is called the baseline length 2592. The angle between the projector optical axis and the baseline is the baseline projector angle 2594. The angle between the camera optical axis 2583 and the baseline is the baseline camera angle 2596. If a point on the source pattern of light 2570 is known to correspond to a point on the photosensitive array 2581, then it is possible using the baseline length, baseline projector angle, and baseline camera angle to determine the sides of the triangle connecting the points 2585, 2574, and 2575, and hence determine the surface coordinates of points on the surface of object 2590 relative to the frame of reference of the measurement system 2560. To do this, the angles of the sides of the small triangle between the projector lens 2572 and the source pattern of light 2570 are found using the known distance between the lens 2572 and plane 2570 and the distance between the point 2571 and the intersection of the optical axis 2576 with the plane 2570. These small angles are added or subtracted from the larger angles 2596 and 2594 as appropriate to obtain the desired angles of the triangle. It will be clear to one of ordinary skill in the art that equivalent mathematical methods can be used to find the lengths of the sides of the triangle 2574-2585-2575 or that other related triangles may be used to obtain the desired coordinates of the surface of object 2590.

The method described with reference to FIG. 11 may be converted to a scanner that projects a line rather than a point, using the principles of triangulation as discussed above.

A camera such as camera 2564 may be a color camera, although in most cases, a separate color camera is provided as a part of the scanner assembly to obtain color images. The position and orientation of the camera relative to the projector 2562 and camera 2580 are known and hence a correspondence between the 2D color images obtained with a color camera attached to a triangulation scanner can be established. The procedure to make this correspondence is a mapping procedure similar to that performed by a TOF scanner as discussed above. Furthermore, most triangulation scanners collect multiple scans which are then registered together, in some cases using a motorized mover that provides accurate movement but in most cases artificial or natural features to register multiple scans together.

Terms such as processor, controller, computer, DSP, FPGA are understood in this document to mean a computing device that may be located within an instrument, distributed in multiple elements throughout an instrument, or placed external to an instrument.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method of optically scanning and measuring a scene, the method comprising:
    providing a first scanner, the scanner including a first light emitter for emitting a first light onto the scene, a first light receiver for receiving a first portion of the first light from the scene, and a first processor, the first scanner having a first angle measuring device, a second angle measuring device and a distance meter;
    providing a second scanner, the second scanner including a second light emitter for emitting a second light onto the scene, a second light receiver for receiving a portion of the second light from the scene, and a second processor;
    measuring with a first scanner in a first scanner location three-dimensional (3D) coordinates and a color for each of a plurality of first object points in the scene based at least in part on the emitting of the first light, an angle measured by the first angle measuring device, an angle measured by the second angle measuring device and a receiving of the first portion with the distance meter;
    measuring with the second scanner in a second scanner location 3D coordinates and a color for each of a plurality of second object points in the scene based at least in part on the emitting of the second light and the receiving of the second portion;
    selecting a plurality of areas within the scene, each area being defined by a plurality of cells and including at least one first object point from the first plurality of object points and further including at least one second object point from the second plurality of object points;
    determining an adapted second color for each second object point, wherein in each of the plurality of areas the adapted second color is based at least in part on a statistical distribution of the colors of the at least one first object point in the area;
    storing the 3D coordinates and the color for each first object point; and
    storing the 3D coordinates and the adapted second color for each second object point.

2. The method of claim 1, wherein the cells are determined by subdividing a measured space with a three-dimensional grid.

3. The method of claim 1, wherein the cells have a cube shape.

4. The method of claim 3, wherein the cubes have an edge length between two centimeters and a decimeter.

5. The method of claim 1, wherein the cells have a tetrahedron shape.

6. The method of claim 1, further comprising:
    determining for each area of the plurality of areas a first color distribution, the first color distribution based at least in part on a relative frequency of color values of the first object points in the area; and
    determining for each area of the plurality of areas a second color distribution, the second color distribution based at least in part on a relative frequency of color values of second object points in the area.

7. The method of claim 6, further comprising determining a target distribution based at least in part on the first color distribution.

8. The method of claim 7, wherein the adapted second color for each second object point is based at least in part on the target distribution.

9. The method of claim 7, wherein the target distribution is further based at least in part on the second color distribution.

10. The method of claim 7, wherein the target distribution is based at least in part on a first number of points in the first color distribution and a second number of points in the second color distribution.

11. The method of claim 7, wherein the determining of the adapted second color further includes determining an adapted first color for each first object point, the adapted first color being based at least in part on the target distribution.

12. The method of claim 7, further comprising adjusting the color of at least one second object point in a first cell of the plurality of cells based at least in part on a distance from the second object point to an adjacent cell of the plurality of cells and on the target distributions of the first cell and the adjacent cell.

13. The method of claim 1, further comprising displaying a color image on a display of at least a portion of the first object points and the second object points.

14. The method of claim 13, wherein the display is selected from a group consisting of a planar display, a panoramic display, and a 3D display.

15. The method of claim 1, wherein in the selecting of the plurality of areas, each area includes a reference point.

16. The method of claim 15, further comprising selecting the reference point from among the second object points.

17. The method of claim 15, wherein the adapted second color of the reference point is based at least in part on colors of and distances to the first object points in the scene.

\* \* \* \* \*